United States Patent
Quinn et al.

(10) Patent No.: US 8,001,021 B1
(45) Date of Patent: Aug. 16, 2011

(54) SYSTEM AND METHOD FOR COMPENSATION QUERY MANAGEMENT

(75) Inventors: Christopher Neil Quinn, Del Mar, CA (US); Anthony L. Creed, San Diego, CA (US); Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 1298 days.

(21) Appl. No.: 11/434,945

(22) Filed: May 16, 2006

(51) Int. Cl.
G06F 17/22 (2006.01)
G07F 19/00 (2006.01)
G06Q 10/00 (2006.01)

(52) U.S. Cl. ....... 705/31; 705/7.11; 705/7.29; 705/7.32; 705/7.33

(58) Field of Classification Search ............... 705/30–32
See application file for complete search history.

(56) References Cited

U.S. PATENT DOCUMENTS

| | | | |
|---|---|---|---|
| 4,648,037 A | 3/1987 | Valentino | |
| 5,600,554 A | 2/1997 | Williams | |
| 5,819,231 A | 10/1998 | Tremaine | |
| 6,401,079 B1 * | 6/2002 | Kahn et al. | 705/30 |
| 6,735,571 B2 | 5/2004 | Coleman | |
| 2001/0027446 A1 * | 10/2001 | Metcalfe | 705/67 |
| 2001/0037268 A1 * | 11/2001 | Miller | 705/31 |
| 2002/0111888 A1 * | 8/2002 | Stanley et al. | 705/31 |
| 2002/0178039 A1 * | 11/2002 | Kennedy | 705/7 |
| 2003/0004847 A1 | 1/2003 | Calderaro et al. | |
| 2004/0064390 A1 | 4/2004 | Pullen | |
| 2004/0167835 A1 * | 8/2004 | Yaur | 705/31 |
| 2005/0125283 A1 | 6/2005 | Fan et al. | |
| 2005/0283397 A1 | 12/2005 | Rimsky | |
| 2007/0005461 A1 * | 1/2007 | Lenz | 705/31 |

* cited by examiner

*Primary Examiner* — Matthew S Gart
*Assistant Examiner* — Ig T An
(74) *Attorney, Agent, or Firm* — Osha • Liang LLP

(57) ABSTRACT

A system for compensation query management includes one or more processors and memory coupled to the processors. The memory stores program instructions executable by the processors to implement an analysis tool. The analysis tool is configured to access representations of a plurality of tax returns and extract compensation-related data from the tax returns. The analysis tool is further configured to compile a version of the compensation-related data into a data store, and access the data store to prepare a response to a compensation query.

15 Claims, 7 Drawing Sheets

SYSTEM AND METHOD FOR COMPENSATION QUERY MANAGEMENT

BACKGROUND

The present invention is directed to computer systems, and more particularly, to computer-implemented interfaces and tools for handling compensation-related queries.

Employee compensation, including both salary and non-salary components such as benefits, typically form a substantial portion of an enterprise's business costs. In an effort to improve profitability, there is a natural tendency for corporations to attempt to limit their compensation-related costs as much as possible. As a result of advancing technologies (such as the ability to quickly access information required to perform a given task from virtually anywhere in the world using the Internet) and a reduction in international trade barriers, it has also become possible to outsource a number of work functions from advanced economies to cheaper economies overseas. The possibility of outsourcing further tends to reduce growth in salaries and other forms of compensation for many types of jobs in advanced economies. At the same time, workers are naturally interested in increasing their income and benefits as much as possible, and corporations desirous of hiring and retaining good employees must ensure that they provide adequate levels of compensation.

Compensation-related negotiations between employees and corporate managers, e.g., during annual reviews for existing employees or during the pre-hiring process for prospective employees, are therefore often crucial in determining the employees' financial status. Neither side in the negotiations has traditionally had the benefit of as much reliable compensation-related information as they would probably prefer: for example, for obvious competitive reasons, most corporations restrict access to their compensation packages as much as possible, so neither a hiring manager for company X nor a prospective employee of company X may be aware of the exact salaries for similar jobs at company Y. Unfortunately from the point of view of employees, traditionally it is the corporate managers who have the advantage when it comes to possessing at least some realistic compensation data—for example, a hiring manager negotiating a salary with a prospective employee of a corporation may at least know the salary ranges for relevant job categories at that corporation, the actual growth in salaries from year to year within the corporation, and so on. The employee or prospective employee typically has relatively limited compensation-related information available (such as hearsay information obtained from friends or from surveys that are known to be unreliable), and is thus often unable to negotiate from as strong a position as his/her management counterpart. An employee's ability to optimize his/her compensation package, and hence their financial status, may be considerably enhanced if reliable compensation-related information were made easily accessible.

SUMMARY

Various embodiments of methods and systems for compensation query management are disclosed. According to one embodiment, a system includes one or more processors and memory coupled to the processors. The memory stores program instructions executable by the processors to implement an analysis tool. The analysis tool is configured to access representations of a plurality of tax returns and extract compensation-related data from the tax returns. The analysis tool is further configured to compile a version of the compensation-related data into a data store, and access the data store to prepare a response to a compensation query. The compensation data extracted from the tax returns may include, for example, salary amounts, taxpayers' postal codes (e.g., ZIP codes) (which may for example be used to determine correlations between salaries and geographical locations), information about the employers of the taxpayers filing the tax returns, non-salary compensation such as health care-related benefits or retirement-related benefits, taxpayers' job titles, and/or various other data elements that may indicate aspects of a taxpayer's financial status and financial profile. It is noted that a variety of approaches may be used in different embodiments to ensure that privacy of taxpayers is not violated, e.g., to ensure that personal identifying information of any given individual is not used by the analysis tool and cannot be determined as a result of the services provided by the analysis tool.

Any of a number of different techniques may be used by the analysis tool to obtain access to the tax returns in various embodiments: for example, tax return data may be accessed from a web-based tax return preparation tool being used by a taxpayer or tax preparer, via an interface provided by an electronic filing (e-filing) mechanism for tax returns prepared on a taxpayer's locally accessible computer, or by querying a database of tax-return data that is maintained by a tax return preparation agency or corporation. The analysis tool may be configured to receive and respond to a wide variety of compensation-related queries in different embodiments, from simple queries such as "What is the average salary of a lawyer in city A?" to more complex queries such as "For software engineers with less than five years experience employed by company C in city B, what proportion of the after-tax salary is spent on housing?" Information extracted from large numbers (e.g., thousands) of tax returns may be used to respond to some queries. Since the compensation-related data used to respond to the queries may be derived from a plurality of actual tax returns, and since there is often a legal and/or financial penalty associated with providing false information in tax returns, the responses are very likely to be based on real compensation-related data, and are therefore likely to be more accurate and comprehensive than compensation data typically available from other sources such as surveys or casual conversations. Possession of accurate and comprehensive compensation information may enable employees or potential employees to strengthen their negotiating positions during compensation negotiations, and may also allow employers to respond more effectively to competitors' compensation plans.

In one embodiment, the analysis tool may be configured to use data from sources other than tax returns (such as census information, or demographic/lifestyle information provided voluntarily by taxpayers during tax preparation but not included in tax returns), e.g., in combination with data extracted from tax returns, to prepare responses to compensation queries. In some embodiments analysis tool 110 may implement an interface allowing users submitting compensation queries to specify whether the responses to their queries should be based on data extracted from tax returns only, or whether additional data sources other than tax returns may be used. Since the data from some sources other than tax returns (such as surveys) may not be as reliable or accurate as data reported in tax returns, some users may wish to ensure that the responses to their queries are based solely on information included in tax returns. In some embodiments, when providing a query response to a user, the analysis tool may be configured to also provide an indication of relative reliability for various portions of the response. For example, if a query result includes a display of some data derived entirely from tax returns and other data derived at least partly from a survey, the data derived from the tax returns may be highlighted in the display to indicate that it is based on a more reliable source.

As noted above, the analysis tool may be configured to ensure that information about the finances of individual taxpayers is not derivable from the responses it provides to compensation queries in some embodiments. For example, taxpayers may not wish to have their salary information made public. The analysis tool may therefore be configured to use aggregate or anonymized versions of data (e.g., versions from which personal identification information such as names, exact addresses at the street or neighborhood level, and social security numbers have been removed) in preparing responses to the compensation queries in such embodiments. In one embodiment, the analysis tool may itself be configured to remove or encrypt personal identification information from the data collected from tax returns and/or other sources before inserting the data into the data store.

In some embodiments, the analysis tool may be configured to support a plurality of service levels for compensation queries: e.g., simple queries corresponding to a first service level may be processed without requiring a payment or subscription, while more complex queries (e.g., queries with a greater number of query terms and/or more choices for response formats) corresponding to a second service level may require the user to pay or subscribe to the service provided by the analysis tool. The analysis tool may provide programming interfaces for programmatic query submission and/or response retrieval, e.g., in accordance with web services standards in some embodiments. The programming interfaces may be used, for example, by other Internet-based service providers such as search engines, recruiting services or map services, to add compensation-related features to their service portfolios.

DETAILED DESCRIPTION OF EMBODIMENTS

Figure 1:
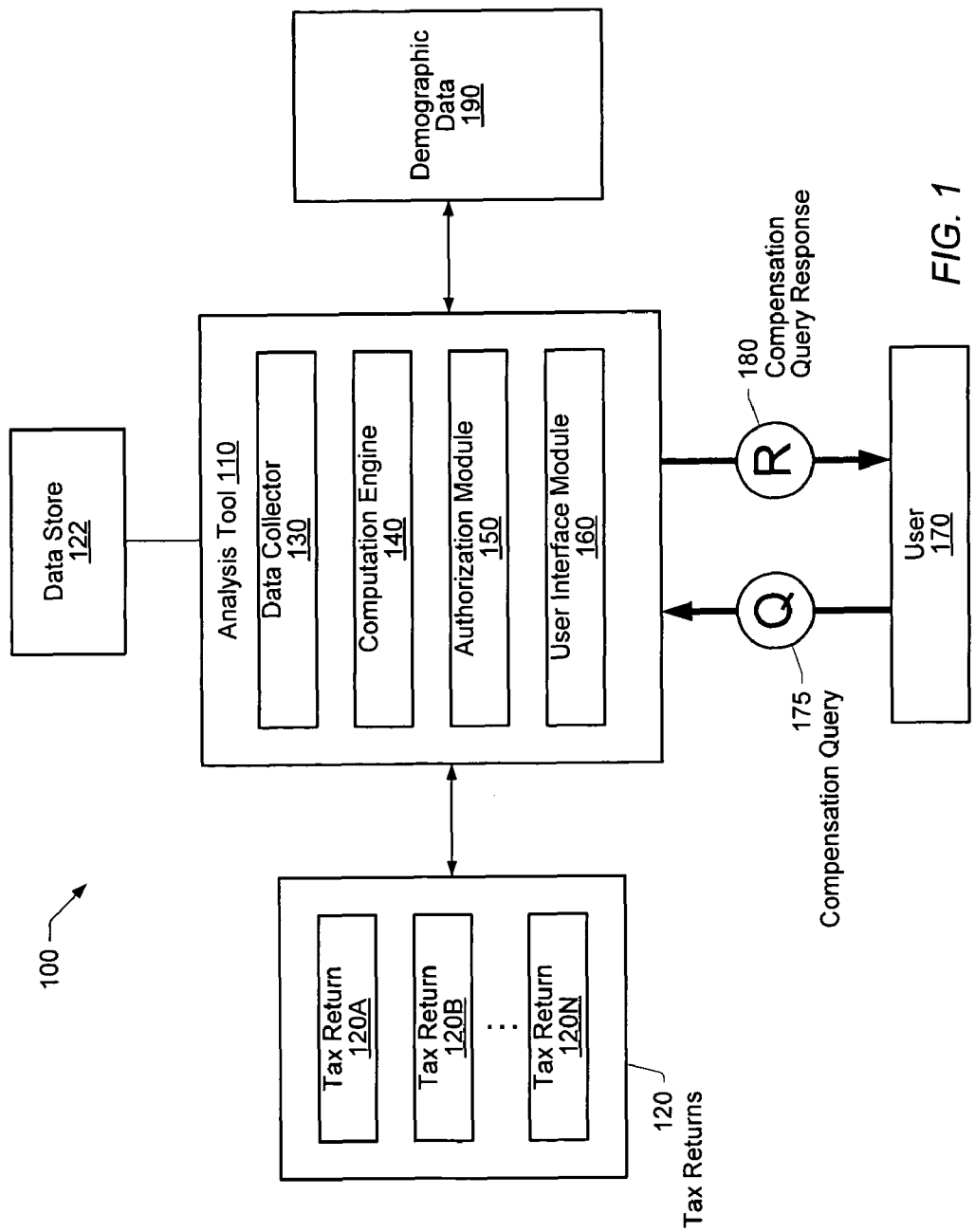
FIG. 1 is a block diagram illustrating one embodiment of a system.

FIG. 1 is a block diagram illustrating one embodiment of a system 100. The system includes an analysis tool 110 configured to access a plurality of representations of tax returns 120 (e.g., tax returns 120A-120N), extract compensation-related data from the tax returns 120 and compile a version of the compensation-related data into a data store 122. The compensation-related data may include a variety of different types of data elements that may be reported in the tax returns 120 in various embodiments, such as salary amounts, taxpayers' postal codes (which may for example be used to determine correlations between salaries and geographical locations), the names and/or addresses of the employers of the taxpayers filing the tax returns, non-salary compensation such as health care-related or retirement-related benefits and accounts (e.g., Individual Retirement Accounts (IRAs) or various types of 401K accounts in the United States, to some of which employers may add funds as a benefit to their employees) and taxpayers' job titles. Other data elements about which information may be retrieved from tax returns 120 include identifications of institutions to which a taxpayer owes money (e.g., mortgage companies or organizations providing automobile loans or student loans) and/or the amounts owed, institutions from which a taxpayer receives money other than salary (e.g., investment management organizations) and/or the amounts received, charitable organizations to which a taxpayer contributes and/or the amounts contributed, and various similar data elements that may indicate aspects of a taxpayer's financial status and financial profile. The analysis tool may be configured to interact with one or more tax preparation tools or mechanisms (such as an electronic filing (e-filing) service for tax returns prepared on a taxpayer's personal computer, or a web-based tax return preparation service) to access the representations of tax returns 120 in some embodiments. The specific formats of the representations of tax returns 120 accessed may differ in various embodiments: e.g., a proprietary encoding of the tax returns 120 may be accessed in one embodiment, a text version of the tax returns 120 may be used in another embodiment, and a tax return 120 whose constituent data elements are stored in one or more tables of a relational database may be accessed in yet another embodiment. It is noted that a variety of approaches may be used in different embodiments to ensure that privacy of taxpayers is not violated, e.g., to ensure that personal identifying information of any given individual is not used by the analysis tool and cannot be determined as a result of the services provided by the analysis tool. In one embodiment, an anonymized version of the compensation-related data may be compiled in the data store 122: e.g., personal identification information such as names, social security numbers, and/or addresses may be removed from the version placed in the data store to protect the privacy of the taxpayers. In other embodiments, the information stored in the data store 122 may not be anonymized.

The analysis tool 110 may also be configured to receive compensation related queries 175 from one or more users 170 in some embodiments. For example, a user may submit a specific query logically equivalent to "What is the expected range of salary that a software engineer with five years software development experience, living in city A and working for company B, should expect?" or a more general query such as "What is the average salary of a product manager working in state S?" In some embodiments, more sophisticated queries involving multiple compensation-related quantities (such as salary and living expenses) may be supported, such as "What is the typical ratio between the after-tax salary and the housing expense for a hardware engineer living in city C and working for company D?" or "For a family of four, what fraction of an engineer's salary in city K is typically spent on education and health care?" Queries about how compensation changes over time or across job positions within a particular organization (e.g., "By what percentage does a manager's salary increase during the first N years at company E?" or "When an individual contributor is promoted to a manager in company F, by how much does the individual's salary typically increase?") may also be supported in some embodiments. The analysis tool 110 may be further configured to access at least a portion of the compensation-related data in the data store 122 to prepare a response 180 to a compensation-related query 175, and provide the response 180 to the user 170. Some queries may be processed using a combination of data derived from tax returns 120 and data obtained from sources other than tax returns 120. Since the compensation-related data in the data store 122 is derived from actual tax returns 120, and since there is often a legal and/or financial penalty associated with providing false information in tax returns, the response 180 is very likely to be based on real compensation-related data. If an employee or a prospective employee is able to obtain responses 180 from analysis tool 110 to specific compensation-related queries 175 using data derived from real tax returns 120, therefore, the employee's position during compensation negotiations may be substantially strengthened, compared for example to a situation in which the employee only has a few compensation-related data points obtained from hearsay, or to situations where the employee has to rely entirely on survey results. Providing compensation-related information using an interface that can be accessed privately (such as the World Wide Web) may be particularly helpful for individuals that may be prevented by cultural norms and/or by shyness from asking others directly about salaries. In addition, the functionality of the analysis tool 110 may also be helpful to corporate hiring managers or human resources personnel, allowing them to obtain realistic data about their competition. For example, if a manager at a company C1 is able to obtain accurate information about the compensation provided by a competing company C2, the manager may be able to adjust company C1's compensation packages to avoid or reduce employee attrition and attract good employees.

In some embodiments, the analysis tool 110 may also be configured to access data from one or more additional data sources other than tax returns 120, such as demographic data 190, to prepare the responses 180. Demographic data 190 may, for example be obtained from the taxpayers during preparation of tax returns 120—e.g., a taxpayer or tax preparer may be asked to voluntarily provide information such as the taxpayer's education level (e.g., whether the taxpayer has an undergraduate degree, a graduate degree, or a post-graduate degree, and if so, what subject the degree(s) are in and where the degrees were obtained), information about the taxpayer's family (such as the ages of the taxpayer's children, if any), lifestyle information such as the number and types of motor vehicles owned by the taxpayer's immediate family, and other similar information that may at least in principle be useful in responding to some types of compensation-related queries 175 but may not be included in tax returns. In one embodiment, responses to at least some of the compensation-related queries may be generated without using data derived from tax returns 120—e.g., demographic data 190 alone may be sufficient to respond to some types of queries. Demographic data provided voluntarily by taxpayers may be used for multiple purposes in some embodiments: e.g., a tax return preparation tool may use the data to suggest possible additional sources of tax deductions that may have otherwise been overlooked by the taxpayer. In other embodiments, some or all of the demographic data 190 may be obtained from sources unrelated to tax return preparation—e.g., from government agencies such as the United States Census Bureau, state legislatures, city councils, various levels of the judiciary, city-level or state-level non-governmental organizations such as chambers of commerce, real estate professionals, and/or from surveys conducted by one or more organizations. In some embodiments, some portions or all of the demographic data 190 may be accessed by the analysis tool without a payment, while access to other portions may require a fee. In one embodiment, the analysis tool 110 may be configured to store a version of at least a portion of demographic data 190 in data store 122: e.g., the analysis tool 110 may extract demographic data from a variety of different sources in different formats, and compile the extracted demographic data into a proprietary or standard canonical format to store it in data store 122. In some embodiments, data store 122 may include persistent storage devices such as disks, disk arrays, and the like, while in other embodiments, at least a portion of data store 122 may be stored in volatile memory such as the main memory of a computer server.

In some embodiments, the analysis tool 110 may comprise a plurality of component modules, with each module specializing in a particular set of the analysis tool's overall functionality. In the embodiment shown in FIG. 1, for example, a data collector module 130 of the analysis tool 110 may be responsible for accessing the representations of tax returns 120 and/or accessing demographic data 190. A user interface module 160 may be responsible for providing one or more query input interfaces to receive compensation queries 175 from users as well as one or more output interfaces for providing responses 180 to users 170. In some embodiments, an authorization module 150 may be responsible for ensuring that a user 170 is authorized to receive results for a particular type of compensation query 175—e.g., in one such embodiment, compensation queries containing more than a specified number of query terms may require advance payment or subscription, and the authorization module 150 may be responsible for ensuring that a user has paid the requisite fee or subscription amount before the user is provided a query response. A computation engine 140 of analysis tool 110 may be responsible for a variety of tasks in some embodiments, such as compiling raw data obtained from tax returns 120 and/or demographic data sources into a common format for inclusion in data store 122, generating one or more queries in an internal query language corresponding to compensation queries 175 received from users 170, optimizing the internal queries (e.g., by transforming the queries into equivalent queries that can be evaluated more efficiently), retrieving results of the internal queries, and/or transforming the results into a format suitable for display to a user 170. It is noted that modular architectures other than that illustrated in FIG. 1 may be used for analysis tool 110 in other embodiments—e.g., an anonymizer module configured to remove personal identification information from compensation-related data may be included within analysis tool 110 in one embodiment. Analysis tool 110 may be implemented as a single monolithic program instead of a collection of functionally distinct modules in some embodiments.

In one embodiment, analysis tool 110 may provide one or more pluggable programming interfaces, such as a pluggable data collection programming interface. New modules compliant with the programming interfaces may be added to the analysis tool 110 without affecting the operation of existing modules: e.g., a module implementing data collection from a new source of compensation-related information may be plugged in to analysis tool 110 without affecting existing data collection modules 130. In one embodiment, analysis tool 110 may provide one or more programming interfaces accessible as a web service, e.g., interfaces to submit compensation-related queries and receive corresponding responses may be implemented in accordance with a platform-independent web services standard such as WSDL (Web Services Description Language). The web service interface may allow the services provided by analysis tool 110 to be accessed from various Internet-based service providers for distribution or syndication to their respective customers. For example, a corporation implementing a general-purpose search engine may add support for compensation-related search queries using the web service interface provided by analysis tool 110, and the organization owning or managing analysis tool 110 may be provided compensation by the corporation for providing responses to the compensation-related queries (e.g., a specified amount for each compensation-related query). In another example, a web site maintained by a chamber of commerce or any other organization dedicated to attracting employment at a particular city or state may provide links to services provided by analysis tool 110 that can be used to obtain accurate compensation-related data for the city or state. Using web services, the information accessible via analysis tool 110 may be combined with other services—e.g., a collaboration with a map provider service may allow "salary maps" for various types of jobs to be developed, showing how salaries vary across cities, regions or countries for the same type of job.

Figure 2:
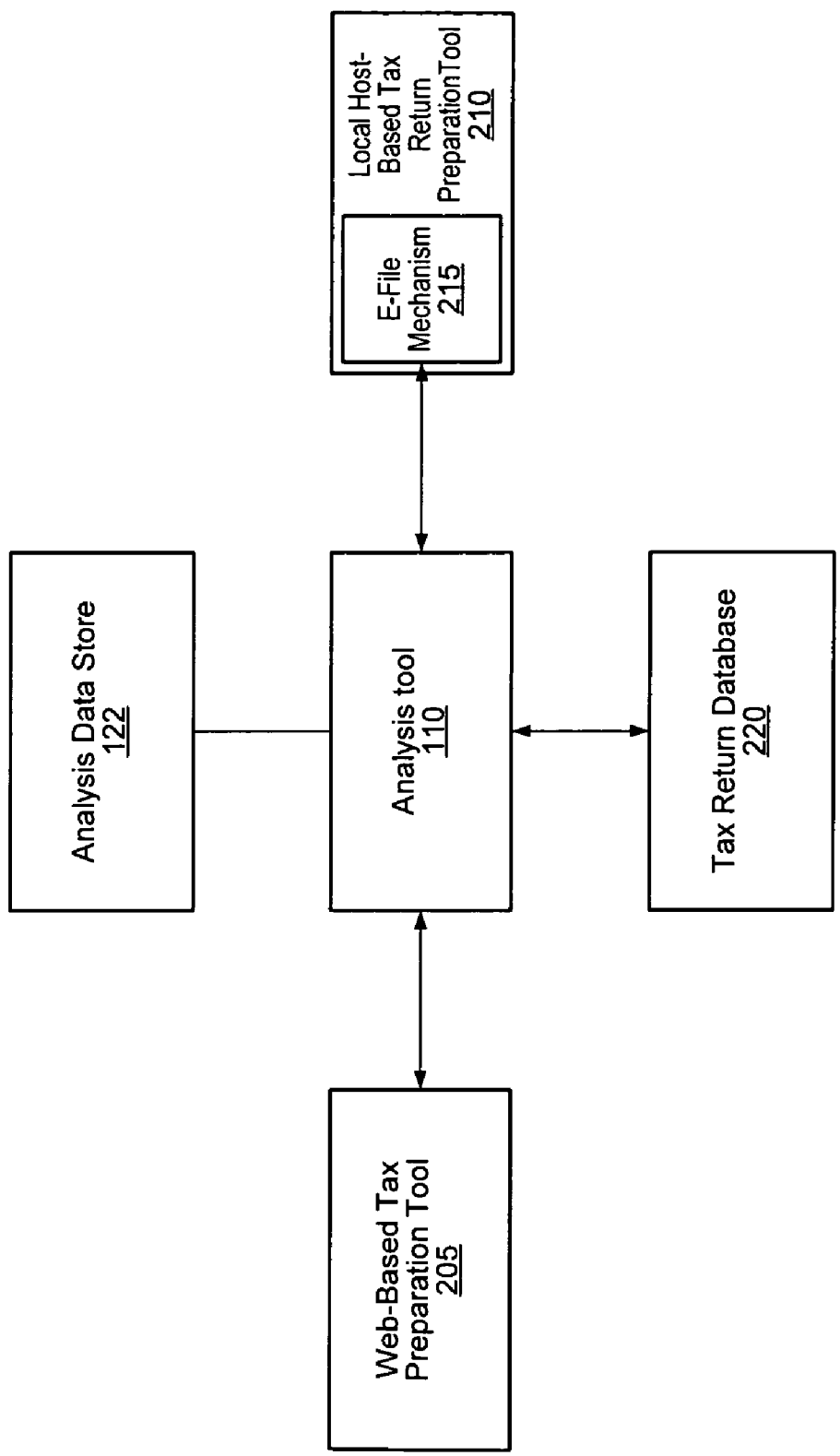
FIG. 2 is a block diagram illustrating a plurality of sources from which an analysis tool may access representations of tax returns, according to one embodiment.

FIG. 2 is a block diagram illustrating a plurality of sources from which analysis tool 110 may access representations of tax returns 120, according to one embodiment. A variety of tax return preparation methods may be used by taxpayers and/or professional tax preparers, and for each tax return preparation method, analysis tool 110 may be configured to extract compensation-related data from the tax returns using a corresponding technique. For example, some tax returns may be filed using a web-based tax return preparation tool 205, in which users may fill out various tax form entries online, without necessarily installing a tax return preparation tool on their local computer systems (such as a home personal computer or laptop). At least a portion of the web-based tax return preparation tool 205 may be implemented using a server such as an application server at a web site managed by a provider of the tool. To extract compensation-related data from tax returns filed using web-based tool 205, analysis tool 110 may be configured communicate directly with the web-based tool 205 (e.g., with an application server at which at least a portion of the tool is executed). In some embodiments, a data collector module 130 of the analysis tool 110 may be notified when a tax return is filed using the web-based tool 205, or may query a server hosting the tool to determine when new tax returns are filed. In response to the notification or determination of tax return filings, the data collector 130 may extract the required compensation-related data, e.g., as a tax return is being transmitted over the network to a tax authority or from an intermediate storage area where the tax return is temporarily stored before being sent to the tax authority, or from a representation of the tax return that may be permanently stored by the web-based tool 205. Other tax returns may be prepared using a tax return preparation tool 210 that is installed on a local host, such as a personal computer or laptop accessible to a taxpayer or tax preparer, and may be filed electronically ("e-filed"). The mechanism 215 used for e-filing may provide one or more interfaces accessible from the analysis tool 110 to extract the compensation-related data: for example, the e-file mechanism 215 may send a copy of a representation of all or a portion of a tax return 120 to the analysis tool 110. E-filing may also be implemented using one or more servers (e.g., at a site managed by the vendor of the tool) other than the host at which the tax return preparation tool 210 is installed in some embodiments, and the analysis tool 110 may communicate with the one or more servers to obtain the compensation-related data.

In some embodiments, an organization that provides tax return preparation services may maintain a database 220 comprising data elements from tax returns 120 (e.g., a relational database comprising a plurality of tables, each containing a respective subset of tax return data elements such as income, capital gains, and taxes withheld) filed using the services. The database 220 may include information corresponding to tax returns filed on paper (i.e., returns that are filed neither using the web-based tool 205 nor e-filing after preparation using a local-host-based tax return preparation tool 210) in some embodiments; for example, copies of the paper tax returns may be scanned electronically using a scanner device, and optical character recognition (OCR) techniques may be used to obtain various data elements of the tax returns 120 and insert them into the database 220. In other embodiments, the database 220 may include representations of tax returns that are filed electronically (e.g., using e-filing mechanism 215) and/or via web-based preparation tool 205 as well. The analysis tool 110 may be configured to use a query language (such as Structured Query Language (SQL) or any other standard or proprietary query language) to extract compensation-related data from the tax return database 220 in one embodiment. Compensation-related data obtained from each of the various sources, such as web-based tax return preparation tool 205, e-filing mechanism 215, or a tax return database 220, may be compiled by analysis tool 110 (e.g., into a standard or canonical form) for inclusion within data store 122. In one embodiment, the analysis tool 110 may be configured to extract data to be used for responding to compensation-related queries from financial data sources other than tax returns 120 and store the additional data within data store 122. For example, the analysis tool 110 may be provided information by a user (such as an account name, a file name or Uniform Resource Locator (URL), and/or a password) allowing the analysis tool 110 to automatically extract data from a personal finance management tool, one or more online banks and/or other financial institutions.

Figure 3:
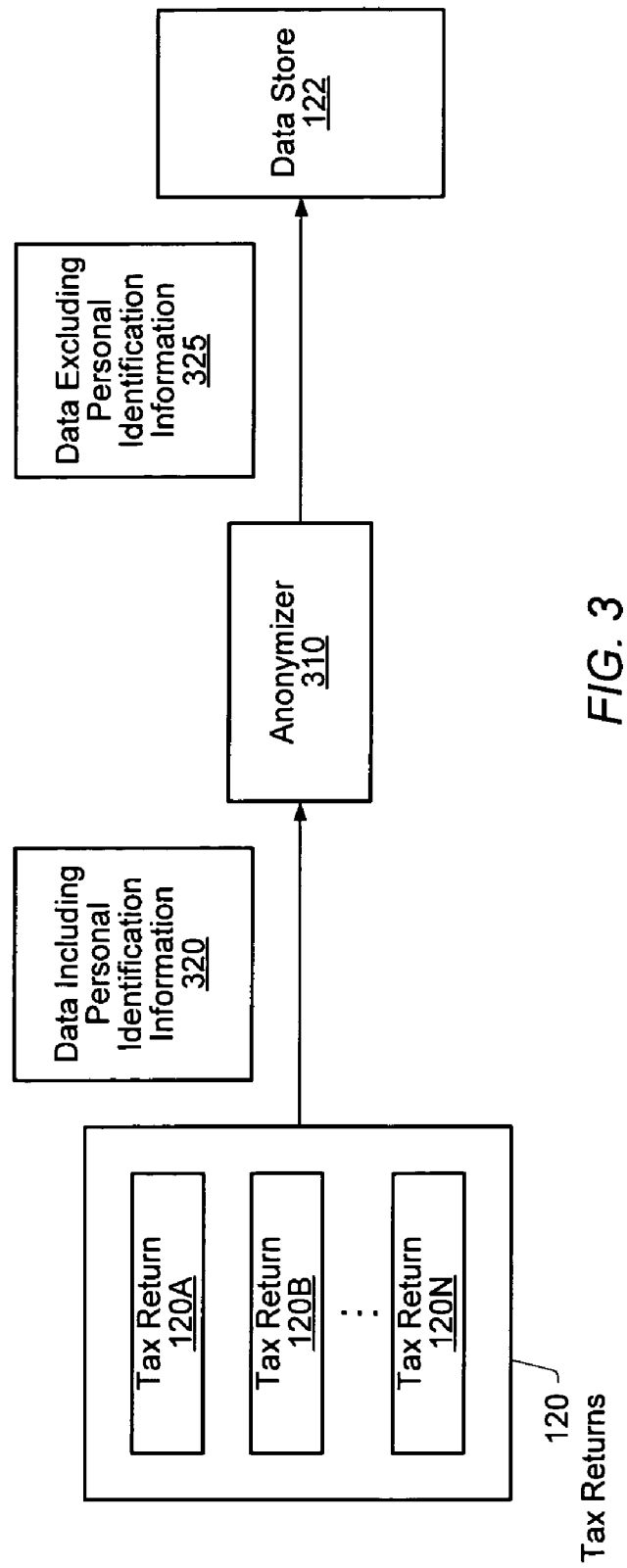
FIG. 3 is a block diagram illustrating an embodiment in which personal identification information may be removed from compensation-related data included in a data store.

FIG. 3 is a block diagram illustrating an embodiment in which personal identification information may be removed from compensation-related data included in data store 122. As shown, an anonymizer 310 may be responsible for obtaining a version of compensation-related data 320 from tax returns 120 that includes personal identification information such as the taxpayer's name, full address and social security number, and modifying the data into a version 325 that does not include the personal identification information prior to storing the data in data store 122. In one embodiment, instead of being removed, the personal information may be modified, e.g., using encryption or some other form of encoding, into a format from which the original personal information cannot easily be regenerated. In some embodiments, anonymizer 310 may be an independent tool external to analysis tool 110, while in other embodiments, the anonymizer 310 may be implemented as a module or component of analysis tool 110. In one embodiment, anonymizer 310 may be configured to ensure that compensation-related data stored in data store 122 cannot be used to identify a particular taxpayer from whose tax return the compensation-related data is derived, even if personal identification information has been removed from the data. For example, in such an embodiment, each data entry in data store 122 may be required to represent aggregated compensation data for at least a specified minimum number of taxpayers (e.g., a thousand taxpayers).

In some embodiments, analysis tool 110 may be configured to obtain explicit permission from taxpayers before using data derived from their tax returns 120 (e.g., using an "opt-in" technique in which a taxpayer has to perform an action such as checking a checkbox) for preparing responses 180 to compensation queries 175. In other embodiments, users of tax preparation tools 205 or 210 may be informed, e.g., at the time they sign an end-user license or a user agreement, that by default, their tax return information may be used to prepare responses to compensation-related queries, and the users may be allowed to indicate (using an opt-out interface such as a checkbox) if they do not wish to have their tax return data used for such purposes. In some embodiments, the data stored within data store 122 may not be anonymized or aggregated prior to insertion into the data store 122: instead, the analysis tool 110 and/or an anonymizer 310 may be configured to ensure, during preparation of a query response 180, that the query response 180 cannot be used to identify a specific taxpayer or a small group of taxpayers. That is, the functionality of anonymizing or aggregating data to protect taxpayer privacy may be performed before compensation-related data is entered into data store 122 in some embodiments, and after compensation-related data is entered into data store 122 in other embodiments. In one embodiments, the data may be anonymized/aggregated prior to entry in data store 122, and analysis tool 110 may also be configured to ensure that a response 180 cannot be used to identify an individual taxpayer or group of taxpayers; i.e., taxpayer privacy may be protected at more than one stage in such embodiments.

Figure 4:
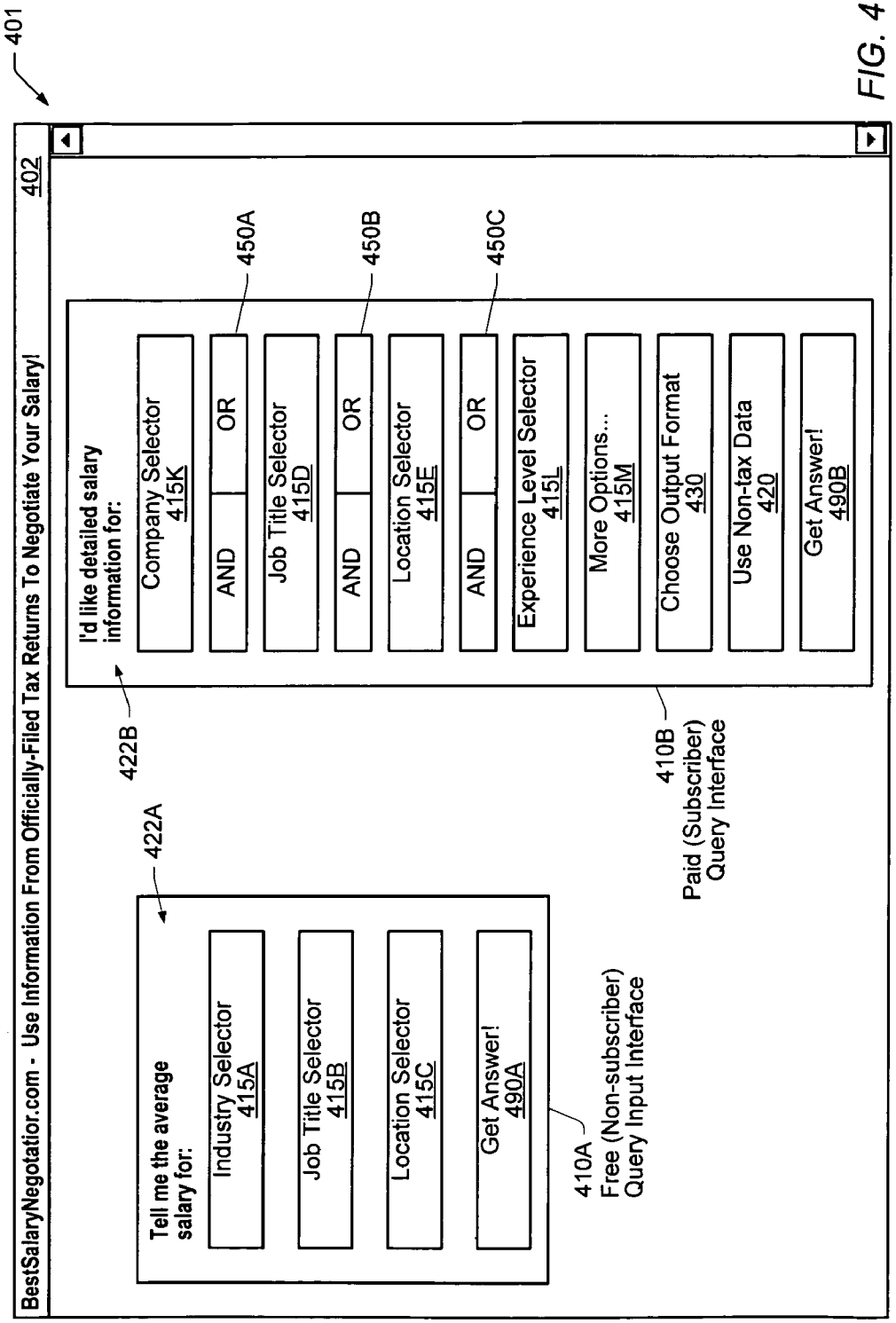
FIG. 4 illustrates a simple exemplary web page allowing a user to submit a compensation query corresponding to one of a plurality of service levels, according to one embodiment.

In one embodiment, analysis tool 110 may be configured to provide a plurality of service levels for compensation queries 175 of varying complexity. FIG. 4 illustrates a simple exemplary web page 401 allowing a user to submit a compensation query 175 corresponding to one of a plurality of service levels, according to one embodiment. As shown, the web page 401 may include a title area 402 (e.g., displaying a name of an entity that owns/manages analysis tool 110, such as "BestSalaryNegotiator.com"), a first interface 410A and a second interface 410B. Interface 410A may allow compensation queries corresponding to a first service level (e.g., a service level that does hot require payment or subscription) to be submitted, while interface 410B may allow more complex compensation queries corresponding to a second service level, but may require payment or subscription. The service levels supported may differ from one another in the number of query terms that may be allowed in each service level, the types of data that may be used to prepare the response 180, the type of data included in the response 180, and/or various other query and response characteristics in different embodiments.

As shown, interface 410A may allow a user to specify one or more query terms, such as an industry (selected via Industry Selector interface element 415A), a job title (selected via Job Title Selector interface element 415B) and a geographical location (selected via Location Selector interface element 415C). Each of the selection interface elements 415 may be implemented using a drop-down menu or any other suitable selection primitive. As indicated by interface element 422A, only average salaries for the selected combination of query terms may be displayed for queries submitted via interface 410A. Only one type of Boolean combination (e.g., "AND" or "OR") of all of the query terms may be permitted in some implementations of interface 410A—e.g., if industry "I-1" is selected using element 415A, job-title "J-1" is selected using element 415B, and location "L-1" is selected using element 415C, only salaries corresponding to industry "I-1" AND job title "J-1" AND location "L-1" may be included in the computation of the average salary provided to the user. After the user selects values for various query terms, an interface element 490A (labeled "Get Answer!") may be used to obtain the response to the query represented by the combination of the query terms.

In contrast, interface 410B, corresponding to a second service level that requires a paid subscription and/or a one-time payment, may provide more sophisticated query capabilities. As indicated by element 422B, more detailed salary-related information may be available via queries submitted using interface 410B than the relatively limited "average" provided in response to queries submitted via interface 410A. More query terms may be supported for the second service level via interface 410B: e.g., in addition to selectors for job title (415D) and location (415E), a selector for indicating a particular company (415K) or for specifying experience levels (415L) may be provided. Options for combining the different query terms using "AND" or "OR" Boolean primitives may also be supported in some embodiments, as indicated by elements 450A, 450B, and 450C, each of which may be individually set to an "AND" or to an "OR" value. In some embodiments, other Boolean primitives such as "AND NOT" may also be supported using elements similar to elements 450A-450C. Additional query terms may be selectable by using interface element 415M ("More Options . . . ") in some embodiments. Different types of output formats (such as a text report format, a line graph format, a bar chart format, a pie chart format, or a combination of various formats) may be selectable using Choose Output Format interface element 430.

In some embodiments, as noted above, data that may not be derived from tax returns (such as demographic data 190 of FIG. 1) may also be used to generate responses to compensation queries 175. In the embodiment depicted in FIG. 4, interface 410B may allow a user to specify whether non-tax data is to be used in generating a query response, e.g., using an interface element 420 labeled "Use non-tax data". A user may, for example, wish to disallow the use of non-tax data for a variety of reasons, such as an expectation that non-tax related data may in general be less reliable than the data reported in tax returns. An interface element 490B ("Get Answer!") may be used to generate a query corresponding to the query terms selected in interface 410B. In some embodiments, when providing a response to a query generated by a user, the analysis tool 110 may be configured to also provide an indication of relative reliability for various portions of the response. For example, if a query result includes a display of some data derived entirely from tax returns and other data derived at least partly from a survey, the data derived from the tax returns may be highlighted in the display to indicate that it is based on a more reliable source. To support a feature, one or more modules of analysis tool 110 (such as computation engine 140 of FIG. 1) may be configured in some embodiments to store reliability tags or attributes associated with the data collected from various sources e.g., within data store 122, data collected from a survey may be tagged differently than data collected from tax returns.

A user may be required to subscribe and/or pay for compensation queries 175 corresponding to a particular service level in some embodiments, such as queries submitted via interface 410B in the embodiment depicted in FIG. 4. Analysis tool 110 (e.g., using authorization module 150 shown in FIG. 1) may be configured to verify, prior to executing a query of a particular service level, that the user submitting the query is authorized to receive responses for queries in such embodiments. In some embodiments, interface elements that may be used to pay for specific queries or for a subscription may be implemented on one or more interfaces supported by analysis tool 110—e.g., a button labeled "Pay/Subscribe" on a web page similar to page 401 may lead the user to a form for filling out credit card information or information corresponding to an alternative payment method.

It is noted that although FIG. 4 illustrates a simple example of a web page interface 401 for supporting query input, other types of interfaces may be implemented for various functions supported by analysis tool 110 in various embodiments. For example, more sophisticated web page interfaces than shown in FIG. 4, which may include graphics, sound, animation, video elements, and other advanced features, may be implemented in some embodiments. In other embodiments, interfaces other than web pages, such as custom graphic user interfaces (GUIs) and/or command-line interfaces may be used. In some embodiments, a "wizard" or similar interface may be used to guide users in the process of generating and/or paying for compensation-related queries. In one embodiment, the analysis tool may provide one or more interfaces for tutorials, user guide documentation, or for viewing example scenarios to help users understand the query generation options and choices. Free trials to for-pay features (such as advanced compensation queries) may be implemented in some embodiments.

Figure 5:
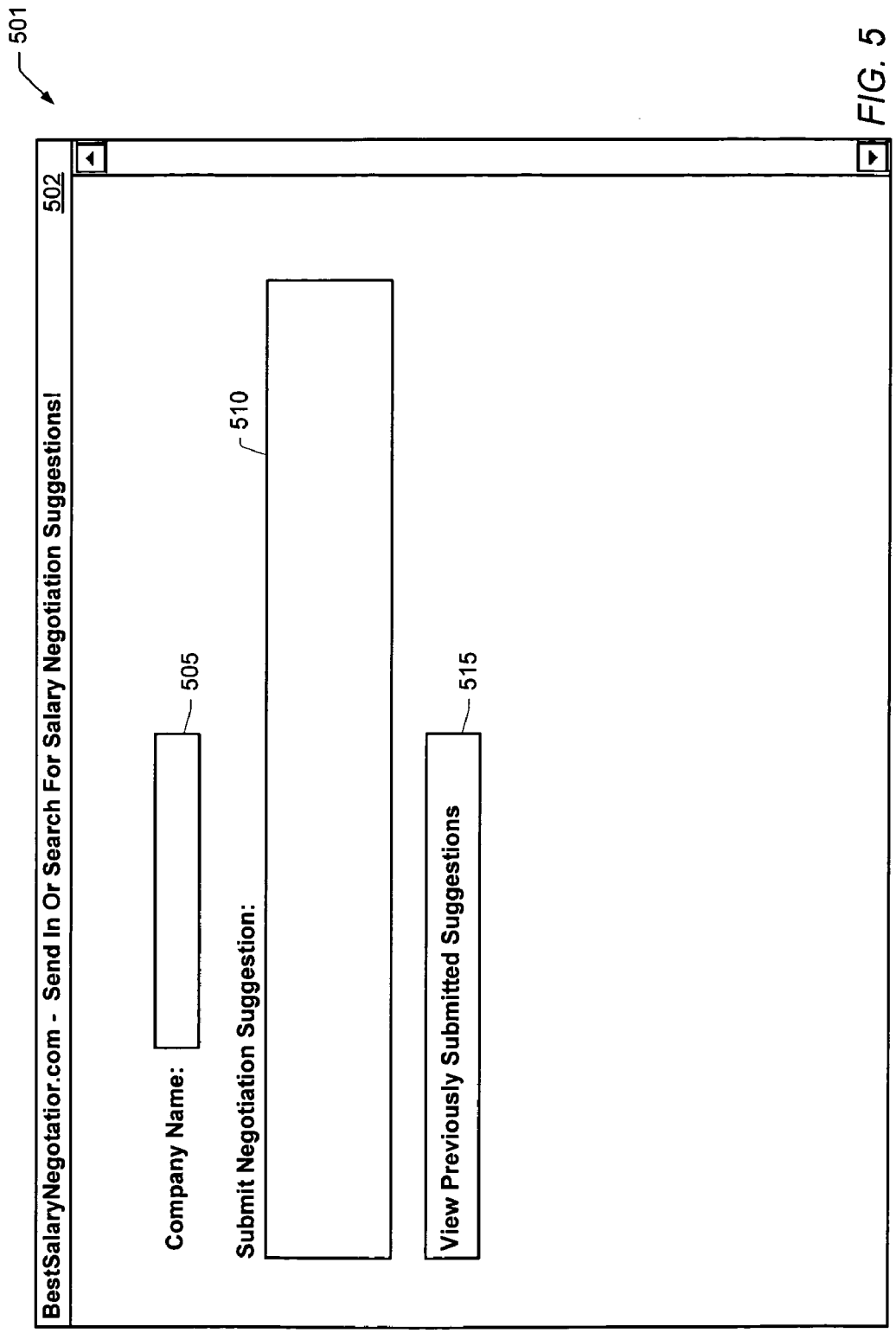
FIG. 5 illustrates a simple example of a web page interface that may be provided by analysis tool to allow users to submit compensation-related suggestions and/or view suggestions provided by other users, according to one embodiment.

In one embodiment, analysis tool 110 may be configured to obtain user-provided suggestions associated with compensation negotiations, and share the suggestions with other users. The suggestions may be based on real-life experiences during compensation negotiations and/or employment at various corporations. E.g., a user may provide a suggestion such as "Company X typically starts with a low salary offer, but is willing to increase the offered salary if you suggest that you have other opportunities available", or "Company Y suggests that yearly 10% bonuses are the norm, but in practice, very few engineers get a 10% bonus every year; most engineers get less than 5%, and raises are rare". FIG. 5 illustrates a simple example of a web page interface 501 that may be provided by analysis tool 110 to allow users to submit compensation-related suggestions and/or view suggestions provided by other users, according to one embodiment. As shown, the web page 501 may include a title area 502 identifying an owner/provider of analysis tool 110 (e.g., "BestSalaryNegotiator.com"), an interface element 505 (entitled "Company Name" in FIG. 5) to enter or select a name of a particular organization for which a suggestion is to be submitted or retrieved, an interface element 510 (entitled "Submit Negotiation Suggestion") to enter text for the suggestion and an interface element 515 (entitled "View Previously Submitted Suggestions") to request a display of suggestions already submitted for the organization identified using interface element 505. In various embodiments, interfaces with a variety of features other than those shown in FIG. 5 may be implemented for compensation-related suggestion input and display.

Compensation-related suggestions may be displayed without identifying the source of the suggestion in some embodiments, e.g., to protect the identity of the submitting user. In other embodiments, information identifying the provider of a suggestion may be made available, e.g., for a fee or to paid subscribers of analysis tool 110. In one embodiment, analysis tool 110 may be configured to automatically exclude submitted suggestions that may potentially result in legal action or negative publicity (e.g., suggestions that include inappropriate language may be discarded). In another embodiment, suggestions stored by analysis tool 110 may be given accuracy or trustworthiness ratings by other users: e.g., if a user U1 submits a suggestion S, and users U2 and U3 find S to be accurate, while user U4 finds S inaccurate, U2, U3 and U4 may each be permitted to indicate a respective rating for S on a 1-to-5 scale. Analysis tool may provide an interface for users to specify ratings of other users' suggestions in such embodiments, and may also be configured to display a summarized version and/or details of the ratings. In some embodiments, analysis tool 110 may provide one or more additional interfaces or mechanisms, such as interfaces to easily set up user groups, wilds (web pages updatable in place by a plurality of users via the Internet), and/or web logs (blogs) allowing users to share their compensation-related suggestions and experiences.

Figure 6:
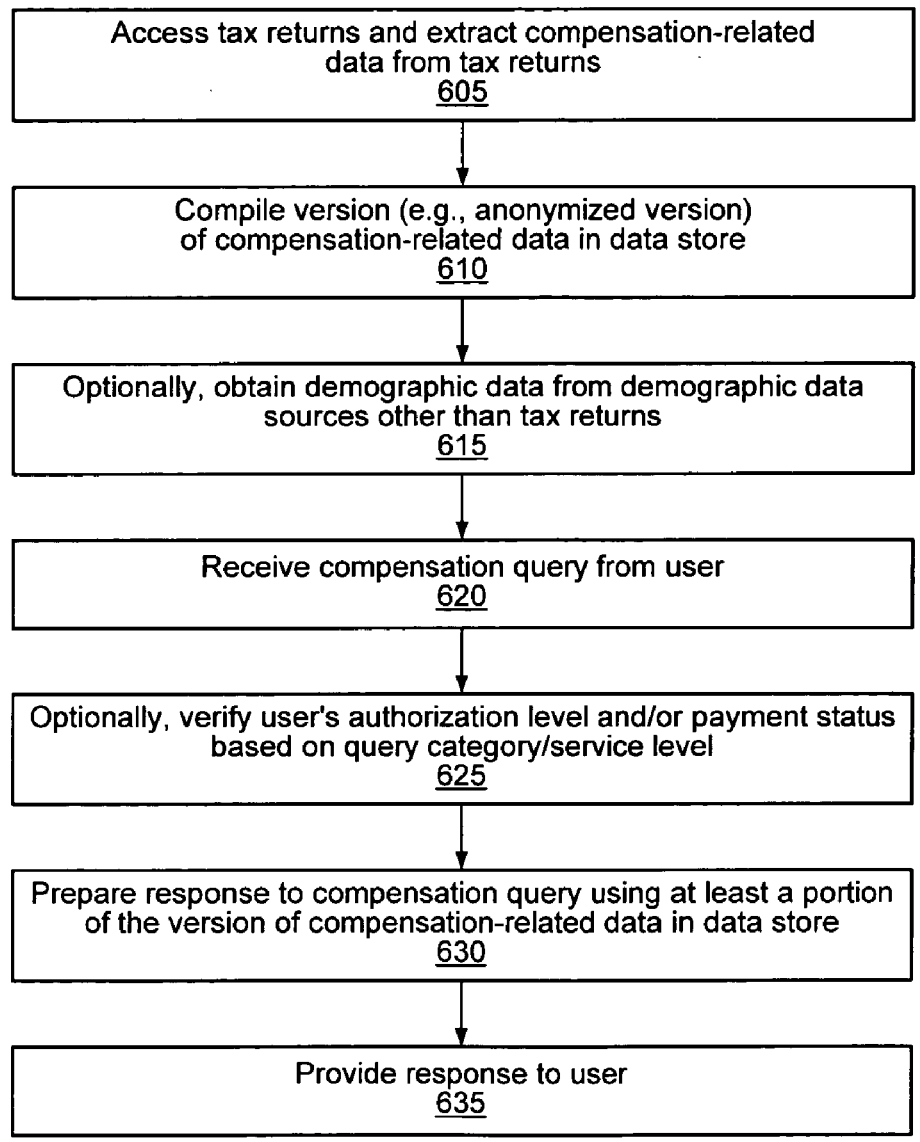
FIG. 6 is a flow diagram illustrating aspects of the operation of analysis tool, according to one embodiment.

FIG. 6 is a flow diagram illustrating aspects of the operation of analysis tool 110, according to one embodiment. As shown in block 605 of FIG. 6, the analysis tool 110 may be configured to access a plurality of tax returns 120 and extract compensation-related data from the tax returns. A number of different techniques may be used in different embodiments to access the tax returns: e.g., the analysis tool may be configured to communicate directly with tax return preparation tools or services (such as an online filing tool or an e-filing service) used by taxpayers to file their returns, or to query a database of tax returns. The analysis tool 110 may be configured to compile a version of the compensation related data obtained from the tax returns into a data store 122 (block 610 of FIG. 6). For example, while the compensation-related data obtained from the tax returns 120 may include information from which the identity of an individual taxpayer may be determined, to ensure that taxpayer privacy is not violated, a modified version of the data may be stored in the data store 122, such that it is not possible to identify information for individual taxpayers from the modified version. The modified version may, in one embodiment, include only aggregated data for groups of taxpayers with similar attributes, instead of storing compensation data separately for each taxpayer. In another embodiment, personal identification information such as a taxpayer name, address or social security number may be removed before the data is placed in data store 122, or the personal, identification information may be encrypted or encoded in such a way that the original personal identification is not easily extractable from the encrypted version. In some embodiments, analysis tool 110 may be configured to obtain additional data (such as demographic data 190 of FIG. 1) from sources other than tax returns 120 (block 615) for use in preparing responses to compensation queries. The additional data may also be included in data store 122 in one embodiment. The data store 122 may be implemented using any of a variety of techniques: e.g., in one embodiment, the data store 122 may comprise one or more tables of a relational database. In some embodiments, the analysis tool 110 may be configured to obtain explicit permission from the taxpayers whose tax returns or other, non-tax-related data are to be used for compensation-related query processing prior to accessing or using the data.

The analysis tool 110 may provide one or more interfaces, such as the interfaces shown in FIG. 4, to allow users to submit compensation-related queries. In some embodiments, a plurality of service levels for query processing may be supported by the analysis tool 110—e.g., relatively simple queries may be processed for free, while more complex and more specific queries may require payment and/or subscription. A wide variety of queries may be supported in various embodiments. For example, in one embodiment, queries submitted in a natural language (e.g., English or Spanish) may be supported, while in another embodiment, queries may have to be assembled by using graphical elements such as buttons or drop-down menus on a web page or a custom GUI. The analysis tool 110 may receive a compensation-related query from a user (block 620) via one of the interfaces. Optionally, e.g., in embodiments where some types of queries require the submitting user to be a subscriber or to provide a payment, the analysis tool 110 may be configured to verify the user's authorization level or payment status prior to processing the query (block 625).

The analysis tool 110 may be configured to prepare a response to the query using at least a portion of the compensation related data compiled in the data store 122 (block 630). To prepare the response, in one embodiment a computation engine 140 incorporated within the analysis tool 110 may be configured to translate the query received from the user into a set of one or more queries in an internal format or language (such as SQL or another query language) that is not exposed to the user, submit each of the translated queries to one or more targets such as data store 110, receive responses to the queries, and translate the responses into a format accessible to the user. The response may then be provided to the user (block 635). In some embodiments, the response may be displayed or provided to the user in accordance with one or more output formats requested by the user—e.g., in addition to viewing a display of the response on a monitor, a user may wish to receive the response via e-mail, or save a version of the response to a file at a designated location.

Figure 7:
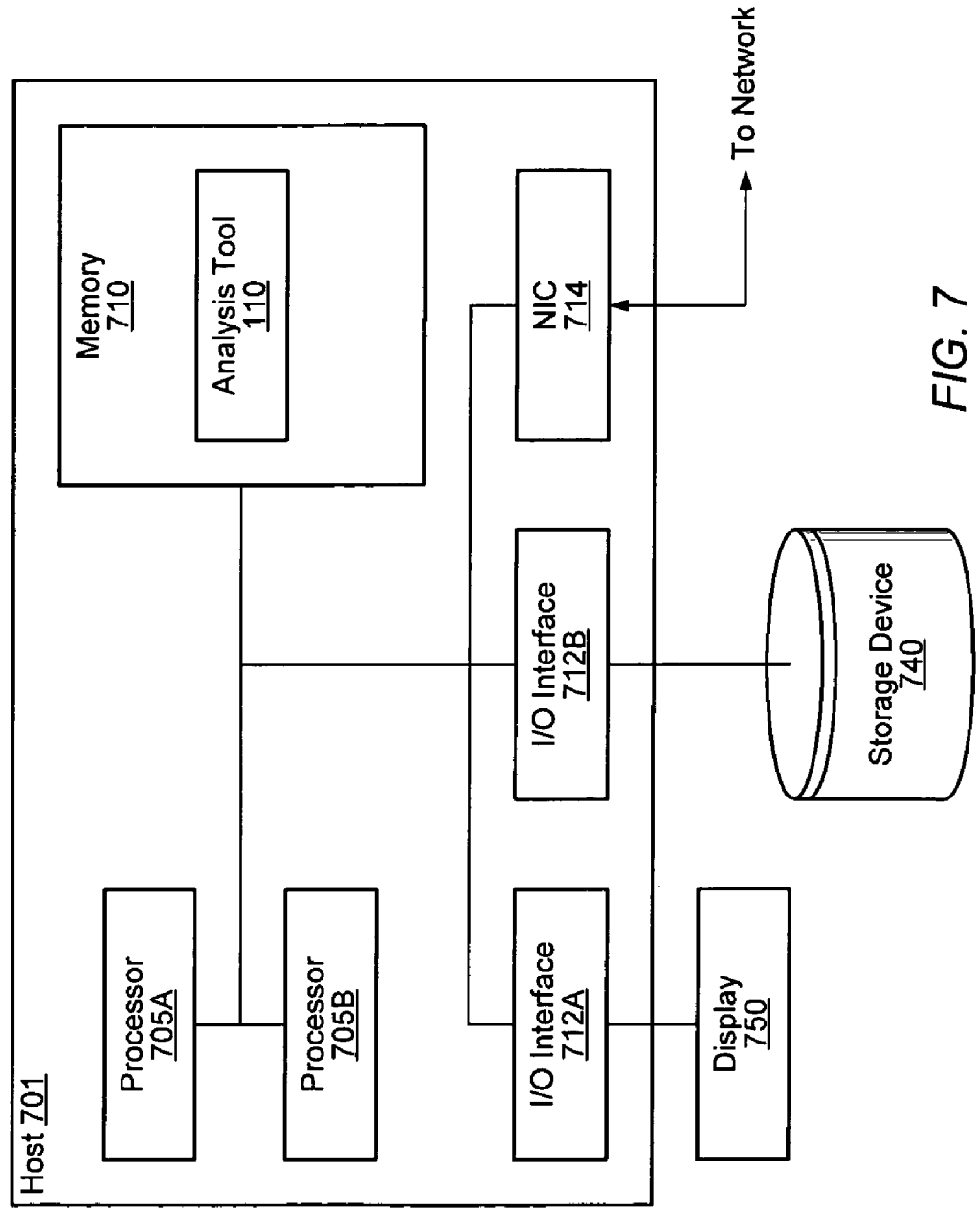
FIG. 7 is a block diagram illustrating constituent elements of a computer host, according to one embodiment While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 7 is a block diagram illustrating constituent elements of a computer host 701 at which at least a portion of analysis tool 110 may be executed, according to one embodiment. Host 701 may include one or more processors 705 (e.g., processors 705A and 705B) implemented using any desired architecture or chip set, such as the SPARC™ architecture, an x86-compatible architecture from Intel Corporation or Advanced Micro Devices, or an other architecture or chip set capable of processing data. Any desired operating system may be run on the host 701, such as various versions of Unix, Linux, Windows™ from Microsoft Corporation, MacOS from Apple Corporation, or any other operating system that enables the operation of software on a hardware platform. Program instructions that may be executable to implement the functionality of analysis tool 110 may be partly or fully resident within a memory 710 at the host 705 at any given point in time, and may also be stored on a storage device 740 such as a disk or disk array accessible from the processors. In various embodiments, analysis tool 110 may be packaged as a standalone application, or may be packaged along with a suite of other software tools. The memory 710 used to store the program instructions may be implemented using any appropriate medium such as any of various types of RAM (e.g., DRAM, SDRAM, RDRAM, or SRAM). In addition to processors and memory, the host 701 may also include one or more I/O interfaces 712 (such as I/O interface 712A providing access to a display 750 and I/O interface 712B providing access to storage devices 740), and one or more network interfaces (such as network interface card (NIC) 714) providing access to a network 250 that may, for example, be linked to the Internet. Any of a variety of storage devices 740 may be used to store the program instructions as well as application data in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like. It should be noted that one or more components of host 701 may be located remotely and accessed via a network. In some embodiments, the functionality of analysis tool 110 may be distributed across multiple computer hosts, e.g., in a cluster configuration. A mobile computing device such as a personal digital assistant (PDA) or an advanced mobile phone may incorporate some or all of the functionality of analysis tool 110 in one embodiment. At least a portion of data store 122 may be included within memory 710 and/or storage devices 740 accessible from the host 701 in some embodiments. In one embodiment, data store 122 may be implemented at a storage device that is accessible via a network from host 701.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a processor;
a memory coupled to the processor; and
an analysis tool residing in the memory, executing on the processor, and configured to:
receive a compensation query comprising an employment position, a geographic location, a name of a company, and a range of experience;
identify a first plurality of representations of electronically filed tax returns filed by a first tax payer and listing the employment position as an occupation of the first taxpayer, wherein at least one of the first plurality of representations of electronically filed tax returns lists the company as an employer of the first taxpayer in the geographic location;
identify a second plurality of representations of electronically filed tax returns filed by a second tax payer and listing the employment position as an occupation of the second taxpayer, wherein at least one of the second plurality of representations of electronically filed tax returns lists the company as an employer of the second taxpayer in the geographic location;
extract, from the first plurality of representations of electronically filed tax returns, a first plurality of salary amounts paid by the company to the first tax payer as compensation for the employment position;
extract, from the second plurality of representations of electronically filed tax returns, a second plurality of salary amounts paid by the company to the second tax payer as compensation for the employment position;
identify, based on a cardinality of the first plurality of representations of electronically filed tax returns, a first number of years of experience in the employment position for the first tax payer;
identify, based on a cardinality of the second plurality of representations of electronically filed tax returns, a second number of years of experience in the employment position for the second tax payer, wherein the first number of years of experience and the second number of years of experience are within the range of experience;
extract, from the first plurality of representations of electronically filed tax returns and the second plurality of representations of electronically filed tax returns, a plurality of employer-contributed benefit amounts corresponding to the employment position in the geographic location;

calculate, based on at least one of the first plurality of salary amounts and at least one of the second plurality of salary amounts, a representative salary amount for the employment position within the company and in the geographic location;

calculate, based on the plurality of employer-contributed benefit amounts, a representative benefit amount for the employment position in the geographic location; and output, in response to the compensation query, a response comprising the representative salary amount and the representative benefit amount.

2. The system as recited in claim 1, wherein the representative salary amount is further based on demographic data obtained from one or more data sources other than the first plurality of representations of electronically filed tax returns and the second plurality of representations of electronically filed tax returns.

3. The system as recited in claim 1, wherein the first plurality of representations of electronically filed tax returns is filed with a tax authority via a web-based tax return preparation tool, wherein the analysis tool is further configured to communicate with the web-based tax return preparation tool to access the first plurality of representations of electronically filed tax returns.

4. The system as recited in claim 1, wherein the second plurality of representations of electronically filed tax returns is prepared using a tax return preparation tool installed locally on a computer system and filed with a tax authority via an electronic filing (e-filing) mechanism, wherein the analysis tool is further configured to access the second plurality of representations of electronically filed tax returns using an interface provided by the e-filing mechanism.

5. The system as recited in claim 1, wherein the analysis tool is further configured to:

provide a first software interface to receive compensation queries associated with a first service level, and a second software interface to receive compensation queries associated with a second service level, wherein the compensation query corresponds to the first service level, and wherein the first service level differs from the second service level in at least a maximum number of allowed query terms.

6. The system as recited in claim 5, wherein the compensation query is received from a user and wherein, prior to outputting the response, the analysis tool is further configured to verify that the user is authorized to obtain a response to compensation queries corresponding to the first service level.

7. The system as recited in claim 1, wherein the analysis tool is further configured to:

provide one or more programming interfaces to receive compensation queries and provide responses to compensation queries, wherein the one or more programming interfaces are accessible as a web service in accordance with a platform-independent web services standard.

8. The system as recited in claim 1, wherein the analysis tool is further configured to:

receive user-provided suggestions to assist other users in negotiating compensation at one or more business entities; and display a suggestion corresponding to a business entity in response to a suggestion request identifying the business entity.

9. A computer readable storage medium comprising a plurality of program instructions which are computer-executable to implement an analysis tool configured to:

receive a compensation query comprising an employment position, a geographic location, a name of a company, and a range of experience;

identify a first plurality of representations of electronically filed tax returns filed by a first tax payer and listing the employment position as an occupation of the first taxpayer, wherein at least one of the first plurality of representations of electronically filed tax returns lists the company as an employer of the first taxpayer in the geographic location;

identify a second plurality of representations of electronically filed tax returns filed by a second tax payer and listing the employment position as an occupation of the second taxpayer, wherein at least one of the second plurality of representations of electronically filed tax returns lists the company as an employer of the second taxpayer in the geographic location;

extract, from the first plurality of representations of electronically filed tax returns, a first plurality of salary amounts paid by the company to the first taxpayer as compensation for the employment position;

extract, from the second plurality of representations of electronically filed tax returns, a second plurality of salary amounts paid by the company to the second taxpayer as compensation for the employment position;

identify, based on a cardinality of the first plurality of representations of electronically filed tax returns, a first number of years of experience in the employment position for the first tax payer;

identify, based on a cardinality of the second plurality of representations of electronically filed tax returns, a second number of years of experience in the employment position for the second tax payer, wherein the first number of years of experience and the second number of years of experience are within the range of experience;

extract, from the first plurality of representations of electronically filed tax returns and the second plurality of representations of electronically filed tax returns, a plurality of employer-contributed benefit amounts corresponding to the employment position in the geographic location;

calculate, based on at least one of the first plurality of salary amounts and at least one of the second plurality of salary amounts, a representative salary amount for the employment position within the company and in the geographic location;

calculate, based on the plurality of employer-contributed benefit amounts, a representative benefit amount for the employment position in the geographic location; and output, in response to the compensation query, a response comprising the representative salary amount and the representative benefit amount.

10. The computer readable storage medium as recited in claim 9, wherein the representative salary amount is also based on demographic data obtained from one or more data sources other than the first plurality of representations of electronically filed tax returns and the second plurality of representations of electronically filed tax returns.

11. The computer readable storage medium as recited in claim 9, wherein the analysis tool is further configured to:

provide a first software interface to receive compensation queries associated with a first service level, and a second software interface to receive compensation queries associated with a second service level, wherein the compensation query corresponds to the first service level, and wherein the first service level differs from the second service level.

12. The computer readable storage medium as recited in claim 9, wherein the analysis tool is further configured to:
provide one or more programming interfaces to receive compensation queries and provide responses to compensation queries, wherein the one or more programming interfaces are accessible as a web service in accordance with a platform-independent web services standard.

13. A computer-implemented method for compensation query management, comprising:
receiving a compensation query comprising an employment position, a geographic location, a name of a company, and a range of experience;
identifying a first plurality of representations of electronically filed tax returns filed by a first tax payer and listing the employment position as an occupation of the first taxpayer, wherein at least one of the first plurality of representations of electronically filed tax returns lists the company as an employer of the first taxpayer in the geographic location;
identifying a second plurality of representations of electronically filed tax returns filed by a second tax payer and listing the employment position as an occupation of the second taxpayer, wherein at least one of the second plurality of representations of electronically filed tax returns lists the company as an employer of the second taxpayer in the geographic location;
extracting, using a hardware processor and from the first plurality of representations of electronically filed tax returns, a first plurality of salary amounts to the first taxpayer as compensation for the employment position;
extracting, by the hardware processor and from the second plurality of representations of electronically filed tax returns, a second plurality of salary amounts paid by the company to the second taxpayer as compensation for the employment position;
identifying, based on a cardinality of the first plurality of representations of electronically filed tax returns, a first number of years of experience in the employment position for the first tax payer;
identifying, based on a cardinality of the second plurality of representations of electronically filed tax returns, a second number of years of experience in the employment position for the second tax payer, wherein the first number of years of experience and the second number of years of experience are within the range of experience;
extracting, from the first plurality of representations of electronically filed tax returns and the second plurality of representations of electronically filed tax returns, a plurality of employer-contributed benefit amounts corresponding to the employment position in the geographic location;
calculating, by the hardware processor and based on at least one of the first plurality of salary amounts and at least one of the second plurality of salary amounts, a representative salary amount for the employment position within the company and in the geographic location;
calculating, based on the plurality of employer-contributed benefit amounts, a representative benefit amount for the employment position in the geographic location; and
outputting, in response to the compensation query, a response comprising the representative salary amount and the representative benefit amount.

14. The method as recited in claim 13, further comprising:
providing a first software interface to receive compensation queries associated with a first service level, and a second software interface to receive compensation queries associated with a second service level, wherein the first service level differs from the second service level; and
receiving the compensation query via the first software interface.

15. The method as recited in claim 13, further comprising:
providing one or more programming interfaces to programmatically receive compensation queries and provide responses to compensation queries, wherein the one or more programming interfaces are accessible as a web service in accordance with a platform-independent web services standard.

* * * * *